Feb. 6, 1945. W. O. HAMPTON 2,368,923
ELECTRIC EXPANSION JOINT
Original Filed Jan. 21, 1941
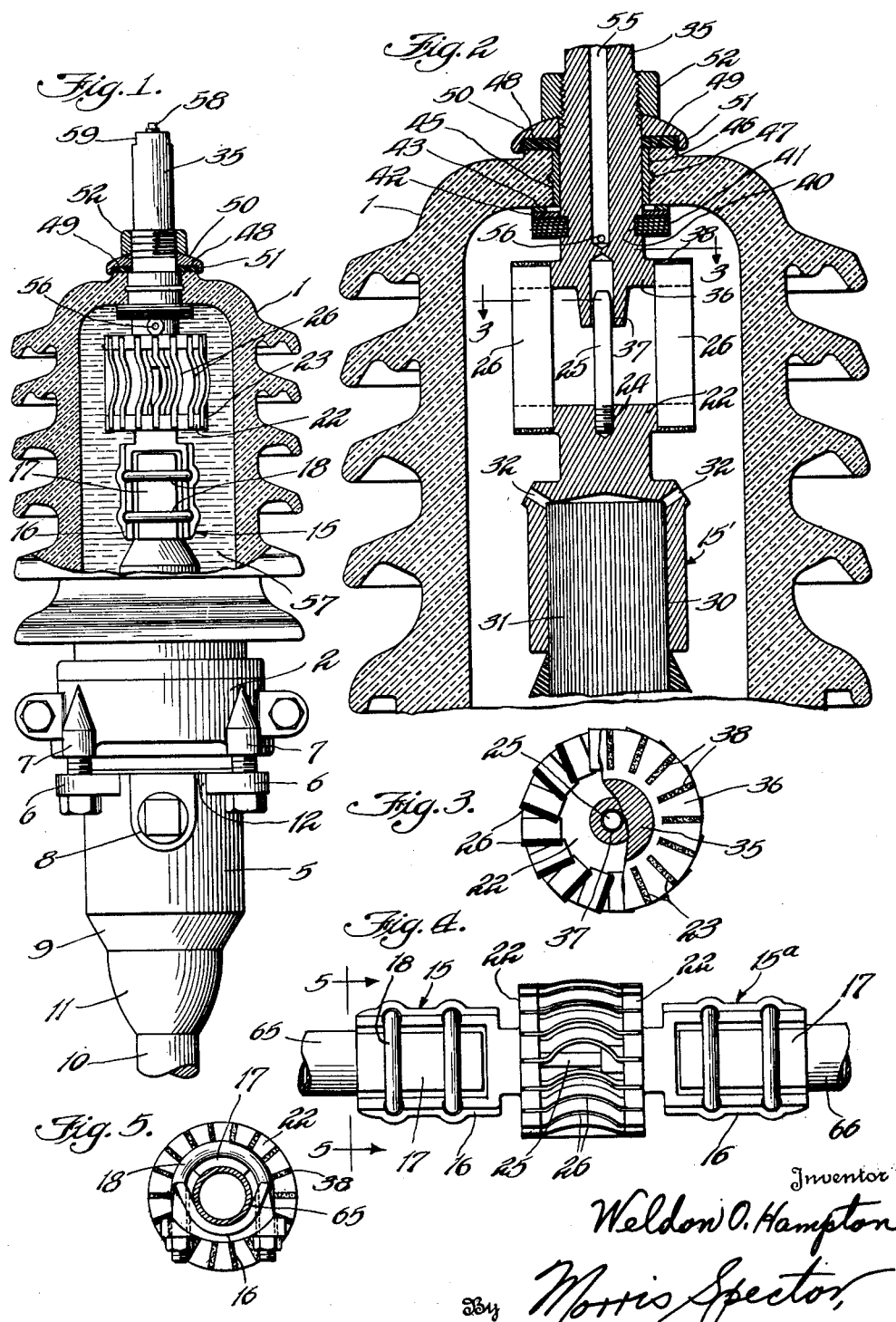
Inventor
Weldon O. Hampton
By Morris Spector
Attorney Patented Feb. 6, 1945

2,368,923

UNITED STATES PATENT OFFICE 2,368,923

ELECTRIC EXPANSION JOINT

Weldon O. Hampton, Chicago, Ill., assignor to The Delta Star Electric Company, Chicago, Ill., a corporation of Illinois Original application January 21, 1941, Serial No. 375,135. Divided and this application December 1, 1941, Serial No. 421,122

9 Claims. (Cl. 174—75)

This application is a division of my application Serial No. 375,135, filed January 21, 1941.

This invention relates to expansion joints, and more particularly to such expansion joints as are specially adapted for use in potheads or terminators.

A pothead is a structure used for terminating the end of an underground cable and establishing electrical connections between the cable end and an overhead line. A pothead generally comprises a hollow body of insulation to the lower end of which the underground cable is secured, with the conductor thereof extending thereinto, where it is electrically connected to a stud or the like that extends through the opposite end of the body. The stud is mechanically sealed to the end of the hollow insulating body so that there can be relative movement between the stud and the insulator. As the cable conductor undergoes expansion and contraction, due to thermal changes, the end of the conductor tends to move within the pothead insulator. Such movement tends to produce considerable stress in the pothead parts unless an expansion joint is provided between the end of the cable conductor and the pothead stud.

It is one of the objects of the present invention to provide an improved expansion joint which is particularly adapted for use in a pothead. In the usual types of expansion joints where there is an absence of a sliding electrical connection between the relatively movable parts it is customary to provide one or a plurality of flexible metallic conductors interconnecting the movable parts. As the parts move towards one another the flexible conductors tend to bow outwardly. This reduces the clearance distance between the flexible conductor and the inner wall of the insulator body. As a result, in the prior constructions where an expansion joint was used it was frequently necessary to increase the internal diameter of the insulator body within which the expansion joint is housed. It is one of the objects of the present invention to provide an expansion joint which does not rely upon sliding joints between current carrying parts and which will not appreciably alter the clearance distance between the live parts and the interior of the insulator as the live parts move with respect to one another. The expansion joint of the present invention comprises a plurality of flexible conductors interconnecting the two relatively movable parts so that upon relative expansion of the two parts towards one another the flexible conductors are not flexed radially outwardly or, if flexed radially outwardly, the amount of flexure in that direction is a minimum. This result is obtained by using flat, flexible conductors, preferably stacks of thin copper or copper bronze laminations which are arranged radially of the axis of the connection so that upon flexure of each stack of laminations the direction of flexing is not radially outwardly of the connector but, rather, in a direction substantially at right angles to the radially outward direction. As a result of this arrangement the overall diameter of the joint does not increase considerably as the two joined conductors move towards one another. By this arrangement the need for clearance between the joint and the adjacent grounded or live parts or between the joint and the surrounding porcelain insulator is not materially increased.

It is a further object of the present invention to provide an improved expansion joint which can be used for electrically and mechanically interconnecting two relatively movable conductors, such as two busbars, and which will not appreciably increase the spacing requirements between two adjacent busbars. In the usual type of expansion joint the flexible conductors that interconnect the movable parts of the joint tend to bow outwardly as the joint is contracted. The spacings between adjacent busbars must therefore be sufficient to allow adequate clearance even when the flexible conductors of the joint of one busbar bow a maximum distance towards an adjacent busbar. In accordance with the principles of the present invention the flexing of the interconnecting conductors in the expansion joint is in a direction having little or no component radially outwardly of the centers of the interconnected conductors. This reduces the spacing requirement otherwise necessary for the busbars.

The expansion joint of the present invention is also applicable wherever any one conductor, such as, for instance, a busbar, is connected to a terminal or stud, as to the terminal or stud of a switch, a circuit breaker, a transformer, or the like, under conditions such that it is desirable to allow for movement of the end of the busbar towards or away from the terminal or stud due, for instance, to the expansion or contraction of the busbar.

In the preferred embodiment of the expansion joint of the present invention the two movable members are connected together by laminated conductors wherein the end of the laminae extend radially of the joint. It is within the purview of the present invention to deviate from the true radius in one direction or the other even to the extent of an appreciable angular difference from the true radius.

The attainment of the above and further objects of the present invention will be apparent from the following specification taken in conjunction with the accompanying drawing forming a part thereof.

In the drawing:

Figure 1 is a front view, in partial section, of a pothead embodying the present invention;

Figure 2 is an enlarged longitudinal sectional view of the top portion of a pothead embodying the present invention;

Figure 3 is a sectional view taken along the line 3—3 of Figure 2;

Figure 4 is a view of an expansion joint of the present invention as applied to the relatively movable hollow busbars; and Figure 5 is a view taken along the line 5—5 of Figure 4.

Reference may now be had more particularly to the embodiment of the invention illustrated in Figure 1. The terminator here shown comprises an insulating bushing 1 in the form of a round body of wet process porcelain, which is supported by a split bronze clamp 2 which may be of any desired construction. The split bronze clamp embraces the lower part of the insulating bushing. An entrance fitting 5 is secured to the split clamp by four bolts extending through lugs 6 on the wiping sleeve 5, which bolts are threaded into sockets 7 formed on the split clamp. The fitting has a filling opening 8 which may be closed by a plug threaded into the opening. The fitting is tapered at its bottom, as indicated at 9. A lead sheathed cable 10 extends into the bottom of the fitting and is sealed thereto by a wiping joint 11 between the fitting and the sheath of the cable. A gasket 12 provides a seal between the bottom of the porcelain, which is ground smooth, and a top flange on the fitting 5.

The insulated conductor within the cable 10 is bared of insulation at its upper end and has a bronze or cast copper terminal or connector 15 secured thereto. The terminal may be secured to the cable conductor in any desired manner as, for instance, by being clamped thereto as shown in Figure 1, or soldered thereto as shown in Figure 2. The clamp connector 15 includes a front clamp portion 16 and a back clamp portion 17 clamped together by two U-bolts 18 that are tightened in place by bronze nuts.

The front clamp portion 16 terminates at its top in a flat circular disc 22 which is an integral part of the front clamp casting 16. The flat circular disc 22 has a large number of narrow radial slots 23 formed therein and has a central drilled and tapped hole 24 into which is threaded a guiding pin 25. Each slot is adapted to receive the ends of a stack of copper laminations 26. Each lamination is preferably as wide as the radial depth of each slot 23. Each lamination is as thin as possible. In one construction each lamination was of a thickness of the order of 0.005 inch, and ¾ inch wide, thirty-six laminations being used for each stack. Each slot 23 was approximately 7/32 inch wide, which is slightly less than the thickness of the thirty-six laminations. The end of each stack of laminations is pressed into a radial slot with the end of the stack of laminations terminating approximately 1/16 of an inch from the edge of the flat circular disc. They are then brazed in place by inverting the connector 15 so that the inserted end of the stack of laminations points upwardly, and then heating the assembly and applying molten phosphor copper in the slots 23. This establishes a metallic connection between adjacent laminations and between the end laminations and the terminal or connector.

The connector 15' of Figure 2 is similar to the connector 15 of Figure 1 differing therefrom only in that it is provided with a cylindrical bore or socket 30 which is adapted to fit over and to be soldered to the bared end of the cable conductor 31. Two small holes 32 are formed in the connector 15' from the bore 30 outwardly to facilitate the soldering operation.

A connector stud 35 extends through the top of the insulator bushing 1. This stud is provided, at its lower end, with a terminal comprising a flat circular disc 36 of a shape and size substantially the same as that of the disc 22. This stud has a central bore 37 into which the pin 25 slides with a loose fit for maintaining the connectors 15 or 15' in alignment with the connector stud during relative longitudinal movement of the two. The circular disc 36 has radial slots 23 formed therein of the same size, shape, number and distribution as the corresponding slots in the disc 22. The opposite end of each stack of laminations 26 is pressed into a radial slot in the disc 36 terminating approximately 1/16 inch below the top of the disc, and is then brazed in place by heating the assembly and applying molten phosphor copper 38 into each slot above the laminations. The molten phosphor copper flows between the laminations and fuses thereto, thus fusing the laminations together and fusing the ends of the outer laminations to the circular disc.

The connector 35 has a peripheral groove formed therein at 40 in which is assembled a group of U-shaped spring discs 41, in this instance six in number. These discs are of a shape and construction such as is illustrated in the pending joint application of the applicant and Elias S. Cornell, Serial No. 212,778, filed June 9, 1938, now Patent No. 2,316,420, dated April 13, 1943, to which reference may be had for a further description thereof. It is sufficient here to state that the assembled discs or washers constitute a spring that requires a tremendous amount of force for compressing it a small distance. Above the spring assembly 41 is placed a felt or metal gasket 42, above which is, optionally, placed a narrow felt gasket 43 that bears against the insulating bushing 1.

The bore 45 in the insulator is intentionally made oversized. It is then mounted in a suitable die, and a ring 46 of lead or other suitable soft bearing metal is cast in the interior of the bore 45 of the insulator. The insulator bore 45 is provided with a peripheral notch 47 into which the cast metal of the ring 46 extends to key the ring 46 in the bore. The metal ring 46 can be cast so that its diameter is exactly the requisite diameter for making a snug fit with the shank of the connector 35.

A sealing gasket 48 of rubber or rubberized material seats on the smoothly ground flat top surface 49 of the insulator and bears snugly against the shank of the connector 35. The base of the entire gasket 48 is supported at the inner periphery of the hole in the gasket 49. The lead 45 supports the gasket and prevents flowing of the gasket material into any space that would otherwise be present between the shank of the connector 35 and the insulator. A hood 50 is slipped over the shank of the connector 35, making a snug fit therewith, and rests on the gasket 48. The bottom of the hood 50 has a downwardly extending circular flange 51 that snugly embraces the gasket 48. A nut 52 threads on the shank of the connector stud 35 and clamps the hood 50 towards the gasket 48. The gasket is thus compressed axially but is substantially entirely confined. The axial compression of the gasket provides a liquid-tight, vacuum-tight seal between the gasket and the top surface 49 of the insulator. Also, the axial compression of the gasket 48 causes it to expand radially into firm sealing pressure engagement with the shank of the connector 35, thus providing a liquid-tight, vacuum-tight seal around the periphery of the connector 35. It is to be noted that the gasket is substantially entirely confined, being supported even at its inner periphery by the ring 46. It is thus held against flowing which would otherwise take place after long periods of time. It is also to be noted that the hood 50 is not turned by turning the nut 52, thus preventing undue stressing of the gasket during tightening of the nut 52.

The connector 35 has a central bore 55 therein terminating in a radial bore 56 opening on the interior of the insulator 1. This permits the escape of air from the interior of the insulator when the insulator is being filled with heated compound 57 through the filling opening 8. A fine threaded plug 58 closes the bore 55. The top of the shank of the connector is squared at 59 to permit gripping of the same by a wrench to hold it against turning as the nut 52 is being tightened. An aerial conductor may be connected to the shank 35 in any desired manner.

As the cable undergoes thermal changes due to changes in the temperature of the ambient medium and due to its own heating by reason of the current flow therethrough, the cable conductor expands or contracts and is thus forced further into the pothead or recedes slightly therefrom. Because of the flexible conductors 26 the cable conductor 31 can move towards or away from the circular disc 36 without subjecting the connector 35 to mechanical stress. As the terminal connector 15 or 15' moves towards the disc 36 the stacks of laminations 26 bow in a direction which is almost at right angles to a radius on the discs 22—36 at the laminations. Thus the extent of the approach of the laminations to the inner periphery of the insulator 1 as the terminal 15' approaches the terminal 35 is negligible. The expansion joint herein shown thus does not compel use of a larger diameter insulator.

During very cold weather the compound with which the insulator is filled frequently becomes quite stiff, almost but not rigid. As the cable 31 heats and expands towards the terminal 35 the compound around the laminations 26 also becomes warm, by reason of the current flow through the laminations 26, so that even though the compound adjacent the inner periphery of the insulator is still very cold and therefore comparatively hard, the compound around the laminations is warmer and therefore softer and does not prevent bowing of the stacks of laminations as the cable conductor 31 expands. It is further to be noted that each stack of laminations is bowed towards the compound that has been warmed by the adjacent stack rather than being bowed radially outwardly towards the cold and therefore comparatively stiffer compound.

In assembling the connector the ends of the stacks of laminations 26 are connected respectively to the flange 22 and the flange 36. Thereafter the stacks of laminations are bowed all in the same direction to the shape illustrated in Figures 1 and 3. This is all done in the factory under factory conditions. The stack of spring washers 41 may also be assembled on the stud 35 in the factory. This connector can then be soldered or clamped as the case may be, to the bared conductor 31 of the cable and then the gaskets 42—43 positioned in place and the stud 35 inserted through the insulator to the position shown. When the nut 52 is tightened it pulls the stud 35 upwardly. It places the confined gasket 48 under a terrific pressure. It also pulls upwardly on the spring assembly 41 tending to flex the inner periphery of the circular spring assembly and the inner periphery of the gasket 42 upwardly. The space between the gasket 42 and the insulator, at the inner periphery of the gasket 42, allows for upward flexing of the gasket and spring assembly adjacent the inner periphery thereof, that is, adjacent the terminal 35. If desired the felt gasket 43 may be entirely eliminated so that the gasket 42 bears directly against the insulator and against the base of the soft metal ring 46. When the terminal 35 is drawn upwardly by tightening of the nut 52, the gasket 42 exerts a large pressure against the inner periphery of the soft metal of the ring 46. The nut 52 may be drawn so tight that when the gasket 43 is omitted the gasket 42 with the spring washer assembly 41 backing it actually deforms the bottom of the soft metal 46 until the original sharp corner at the inner lower periphery of the metal ring 46 is deformed so that it is rounded at a comparatively large radius. This provides a large bearing area for the gasket 42 along the inner periphery thereof, even though the nut 52 has been tightened exceedingly tight.

As the cable is subjected to expansion and contraction due to thermal changes, the end of the cable 31 moves upwardly or downwardly, but does not exert any appreciable pressure against the stud 35. The gasket 48 is thus maintained under pressure by the spring assembly, which pressure is not increased or decreased by a pull or push of the cable conductor as it moves to and fro due to thermal changes, such as occur in cycles due to the daily heating and cooling of the cable. As the stud 35 undergoes thermal expansion or contraction the spring assembly 41 maintains the gasket 48 under pressure, for at no time does the stud 35 expand enough to relieve the original compression of the spring 41. Furthermore, as the gasket 48 ages and sometimes tends to set, the spring 41 constantly maintains that gasket under pressure. To produce this result the nut 52 is initially tightened sufficiently to place the gasket 48 and the spring 41 under a terrifically high pressure.

Reference may now be had more particularly to Figure 4 wherein I have shown the present expansion joint applied to hollow tubular conductors, such as busbars. In this figure the connector or terminal 15 is connected to a tubular busbar 65, and a similar connector 15a is connected to another tubular busbar 66. The two connectors are of identical construction, the same construction as the conductor 15 of Figure 1, except that one carries the pin 25 and the other has the oversized bore 37 of Figure 2 for receiving the end of the pin, thus maintaining the terminals in alignment during relative movement. The terminals are joined by the stacks of laminations 26. As the busbars approach one another or recede from one another during thermal changes, the conductors 26 flex but do not bow radially outwardly any appreciable amount.

When busbars employ expansion joints of the type wherein the flexible conductor bows radially it is necessary to provide greater spacing between busbars so as to have adequate spacing when the flexible conductors of the expansion joints are bowed outwardly their maximum extent. In the present joint there is substantially no outward bowing of the flexible conductors during such relative movement of the busbars. Therefore the spacing between adjacent busbars does not have to be substantially increased because of the expansion joints. This is of importance in those instances of indoor or outdoor stations where the space available for busbars is limited.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A pothead comprising a casing, a cable conductor extending into and secured to the casing at one end thereof, a terminal stud extending through and secured to the casing at the opposite end thereof, a connector terminal at the end of the cable within the casing, and flat flexible conductor strips connecting the two terminals, the flat sides of the strips extending substantially radially of the casing between the terminals whereby upon approaching movement of the two terminals the strips bow in a direction substantially normal to the radius.

2. An electric expansion joint comprising a pair of aligned relatively movable terminal members, stacks of flexible laminations connecting the members and spaced from one another about a common center, the wide portion of each lamination intersecting a plane normal to the aligned members, the lines of intersection being at a substantial angle to a circle in such plane centered at said common center and passing through the center part of the lamination.

3. An electric expansion joint comprising a pair of relatively movable terminal members, each member having a plurality of slots formed therein from the outer periphery of the member inwardly of the member towards the center thereof, and flexible conductors connecting the two members, the ends of each conductor extending edgewise into a slot in each member.

4. An electric expansion joint for electric conductors, said joint comprising two relatively movable members, said members having conductor receiving surfaces arranged around a common center and extending radially thereof, and flexible electric conductors interconnecting the two members, each flexible conductor being secured to the two members at the radially extending surfaces thereof, the conductors being in stacks each of which stacks has substantially less flexibility in a direction along a line from the center of the stack to said common center than in a direction at right angles to such a line.

5. An electric expansion joint for electric conductors, said joint comprising two relatively movable members, means for maintaining the members in relative alignment during relative movement of the members, said members having conductor receiving surfaces arranged about a common center and extending radially thereof, and flexible electric conductors interconnecting the two members, each flexible conductor being secured to the two members at the radially extending surfaces thereof and being of a greater width in a direction radially from the center of the conductor to the common center than the thickness of the conductor.

6. An electric expansion joint comprising a pair of terminal members each having a plurality of substantially radial slots therein, and stacks of flexible laminated conductors, opposite ends of each stack being in slots in the respective members and with each lamina extending widthwise substantially radially of the terminals at the end of the lamina.

7. An expansion joint for connecting two electric conductors, said joint comprising a pair of terminal members connected each to one of the conductors, said terminals having spaced discs opposite one another, each of said discs having radial slots therein, and flexible conductors of a width substantially greater than their thickness each extending from a slot in one disc to a slot in the other disc and connecting the two discs with the wide side of each flexible conductor lying at a substantial angle to a tangent of a circle centered at the center of the joint and passing through the center of the conductor.

8. An expansion joint for connecting two electric conductors, said joint comprising a pair of terminal members connected each to one of the conductors, said terminals having spaced discs opposite one another, means for guiding the discs and maintaining them in alignment as they move towards and away from one another, each of said discs having radial slots therein, and flexible conductors each extending from a slot in one disc to a slot in the other disc and connecting the two discs, the slots and the assembled conductors therein being of substantially greater length radially than their width across the slot, whereby upon approaching movement of the discs each conductor bows between the slots in a direction approximately at right angles to the radius of the discs at the conductor.

9. An electric expansion joint for electric conductors, said joint comprising two relatively movable members, said members having conductor receiving surfaces arranged around a common center and extending radially thereof, and stacks of flexible conducting laminae interconnecting the two members, each stack of laminae being secured to the two members at the radially extending surfaces thereof, each lamina being positioned with its width extending approximately radially of said center.

WELDON O. HAMPTON.